United States Patent
Rijns et al.

(10) Patent No.: US 11,856,344 B2
(45) Date of Patent: Dec. 26, 2023

(54) SELF-POWERED SENSOR, AND MONITORING SYSTEM INCLUDING SAME

(71) Applicant: GENTLE ENERGY CORP., Seoul (KR)

(72) Inventors: Johannes Jozef Franciscus Rijns, Weert (NL); Sangjoon Nam, Seoul (KR); Charles Kiseok Song, Seoul (KR)

(73) Assignee: GENTLE ENERGY CORP., Seoul (KR)

( * ) Notice: Subject to any disclaimer, the term of this patent is extended or adjusted under 35 U.S.C. 154(b) by 0 days.

(21) Appl. No.: 17/691,925

(22) Filed: Mar. 10, 2022

(65) Prior Publication Data

US 2022/0201375 A1 Jun. 23, 2022

Related U.S. Application Data

(63) Continuation of application No. PCT/KR2020/013042, filed on Sep. 25, 2020.

(30) Foreign Application Priority Data

Sep. 27, 2019 (KR) .......................... 10-2019-0119526
Sep. 25, 2020 (KR) .......................... 10-2020-0124404

(51) Int. Cl.
*H04Q 9/00* (2006.01)
*G08B 21/08* (2006.01)
(Continued)

(52) U.S. Cl.
CPC .............. *H04Q 9/00* (2013.01); *G06F 18/24* (2023.01); *G08B 21/182* (2013.01); *H02N 2/181* (2013.01);
(Continued)

(58) Field of Classification Search
CPC ........... H04Q 2209/00; H04Q 2209/10; H04Q 2209/40; H04Q 2209/43; H04Q 2209/70;
(Continued)

(56) References Cited

U.S. PATENT DOCUMENTS 7,361,998 B2 * 4/2008 Hamel .................. H02N 2/186
290/1 R
7,541,695 B2 * 6/2009 Li .......................... H02J 9/062
307/66
(Continued)

FOREIGN PATENT DOCUMENTS

JP 2000052183 A * 2/2000 ............. B23Q 11/00
JP 2008-109646 A 5/2008
(Continued)

OTHER PUBLICATIONS

International Search Report and Written Opinion dated Jan. 27, 2021 in International Application No. PCT/KR2020/013042. (English translation of ISR.).
Office Action of the corresponding Japanese Application No. 2022-518684 dated Jun. 6, 2023.
(Continued)

*Primary Examiner* — Franklin D Balseca
(74) *Attorney, Agent, or Firm* — Knobbe, Martens, Olson & Bear, LLP (57) ABSTRACT

This application relates to a self-powered sensor and a monitoring system including the same. In one aspect, the self-powered sensor includes a power generation unit converting an external physical stimulus into electrical energy, and a sensing unit generating and transmitting a sensing signal corresponding to the electrical energy. The sensing unit may include an electrical energy storage unit storing the electrical energy transmitted from the power generation unit, a switching unit switching to an energized state or a power-saving state according to the comparison result of the
(Continued)

storage amount of the electrical energy stored in the electrical energy storage unit and a reference storage amount. The sensing unit may also include a processor generating and wirelessly transmitting a sensing signal based on the electrical energy stored in the electrical energy storage unit when the switching unit switches to the energized state.

3 Claims, 10 Drawing Sheets

(51) Int. Cl.
  *H02N 2/18* (2006.01)
  *G06F 18/24* (2023.01)
  *G08B 21/18* (2006.01)

(52) U.S. Cl.
  CPC ......... *H02N 2/186* (2013.01); *H04Q 2209/88* (2013.01)

(58) Field of Classification Search
  CPC ........... H04Q 2209/80; H04Q 2209/82; H04Q 2209/88; H04Q 2209/883; H04Q 2209/886; H04Q 9/00; G06F 18/24; G08B 21/182; H02N 2/181; H02N 2/186
  See application file for complete search history.

(56) References Cited

U.S. PATENT DOCUMENTS

| | | | | |
|---|---|---|---|---|
| 9,246,414 | B2* | 1/2016 | Sakaguchi | H02N 2/188 |
| 9,762,150 | B2* | 9/2017 | Ludlow | H02N 2/181 |
| 10,767,642 | B2* | 9/2020 | Tournebize | B29C 48/92 |
| 10,966,156 | B2* | 3/2021 | Van Vugt | H04W 52/028 |
| 11,209,007 | B2* | 12/2021 | Rosca | H02K 11/20 |
| 11,222,202 | B2* | 1/2022 | Kean | G06F 18/217 |
| 2010/0076714 | A1 | 3/2010 | Discenzo | |

FOREIGN PATENT DOCUMENTS

| | | |
|---|---|---|
| JP | 2012-065533 A | 3/2012 |
| JP | 2014-062775 A | 4/2014 |
| JP | 2018-004473 A | 1/2018 |
| JP | 2018-155543 A | 10/2018 |
| KR | 10-2001-0093337 A | 10/2001 |
| KR | 10-2013-0023810 A | 3/2013 |
| KR | 10-1449605 B1 | 10/2014 |
| KR | 10-2018-0020626 A | 2/2018 |
| KR | 10-1986838 B1 | 5/2019 |
| KR | 10-2019-0108045 A | 9/2019 |

OTHER PUBLICATIONS

Office Action of the corresponding Korean Application No. 10-2020-0124404 dated Apr. 22, 2022.

* cited by examiner

SELF-POWERED SENSOR, AND MONITORING SYSTEM INCLUDING SAME

CROSS REFERENCE TO RELATED APPLICATIONS

This is a continuation application of International Application No. PCT/KR2020/013042, filed on Sep. 25, 2020, which claims the benefit of Korean Patent Applications Nos. 10-2019-0119526 filed on Sep. 27, 2019 and 10-2020-0124404 filed on Sep. 25, 2020 in the Korean Intellectual Property Office, the entire disclosure of each of which is incorporated herein by reference.

BACKGROUND

Technical Field

The present disclosure relates to a self-powered sensor and a monitoring system including the same.

Description of Related Technology

In general, in factories using industrial machines, facilities, robots, etc., various detection sensors are used to secure information such as the operating status of these mechanical devices and whether a failure has occurred and safety of workers. These detection sensors enable efficient and safe management of large-scale devices, and thus their use is gradually expanding.

Common detection sensors are operated by power supplied from a separate power source (e.g., power supplied from a battery built in the sensor or power supplied through a power cable). In the case of a detection sensor operating by power supplied from the battery, environmental pollution may occur, and in the case of a detection sensor operating by power supplied through the power cable, wiring and space are required for power supply.

The above-mentioned background art is technical information that the initiator had for the purpose of derivation of the present disclosure or acquired in the process of derivation of the present disclosure, and it cannot necessarily be said to be a known technique disclosed to the general public before the filing of the present disclosure.

SUMMARY

An object of the present disclosure is to provide a self-powered sensor capable of transmitting a signal wirelessly and operating by self-generation without a power source such as a battery.

An object of the present disclosure is to provide a self-powered sensor that does not require wiring for supplying power.

An object of the present disclosure is to provide a self-powered sensor capable of miniaturization and weight reduction.

An object of the present disclosure is to monitor an operating state of a target device based on a detection signal wirelessly received from a self-powered sensor attached to the target device.

The objects to be solved by the present disclosure are not limited to the above-mentioned objects, and other objects and advantages of the present disclosure, which are not mentioned above, may be understood by the following description and more clearly understood than the embodiments of the present disclosure. In addition, it will be appreciated that the problems and advantages to be solved by the present disclosure may be realized by means and combinations thereof shown in the claims of the patent.

A self-powered sensor according to an embodiment of the present disclosure includes a power generation unit converting an external physical stimulus into electrical energy, and a sensing unit generating and transmitting a sensing signal corresponding to the electrical energy, wherein the sensing unit includes an electrical energy storage unit storing the electrical energy transmitted from the power generation unit, a switching unit switching to an energized state or a power-saving state according to the comparison result of the storage amount of the electrical energy stored in the electrical energy storage unit and a reference storage amount, and a processor generating and wirelessly transmitting a sensing signal based on the electrical energy stored in the electrical energy storage unit when the switching unit switches to the energized state.

A monitoring device according to an embodiment of the present disclosure includes a self-powered sensor mounted on a monitoring target device to generate and transmit a sensing signal corresponding to physical energy generated by the monitoring target device, and a monitoring device collecting the sensing signal transmitted by the self-powered sensor and monitoring the status of the monitoring target device, wherein the monitoring device includes a generator generating monitoring sensing data combining the sensing signal and a signal receiving period indicating how frequently the sensing signal is received at the monitoring device, a determination unit calculating a rate of change of the signal receiving period from the monitoring sensing data and determining whether an operation of the monitoring target device is abnormal based on the rate of change of the signal receiving period, and a control unit for generating monitoring result information controlling the operation of the monitoring target device in response to the determination result of the determination unit.

A monitoring device according to another embodiment of the present disclosure includes a self-powered sensor mounted on a monitoring target device to generate and transmit a sensing signal corresponding to physical energy generated by the monitoring target device, and a monitoring device collecting the sensing signal transmitted by the self-powered sensor and monitoring the status of the monitoring target device, wherein the monitoring device includes a first generator generating monitoring sensing data as time series data combining the sensing signal and a signal receiving period indicating how frequently the sensing signal is received at the monitoring device, and a classification unit classifying the status information of the monitoring target device corresponding to the monitoring sensing data by using an unsupervised learning-based deep learning model trained in advance to classify the status information of the monitoring target device when monitoring sensing data is input.

In addition, other methods for implementing the present disclosure, other systems, and a computer-readable recording medium storing a computer program for executing the method may be further provided.

Other aspects, features and advantages other than those described above will become apparent from the following detailed description of the drawings, claims and disclosure.

According to the present disclosure, a self-powered sensor may be operated without a separate power source.

In addition, since the self-powered sensor does not require power supply lines and signal communication lines, it may be easily installed in various target devices such as established factories, ships, airplanes, and trains.

In addition, since it is possible to reduce the size and weight of the self-powered sensor, the self-powered sensor may be attached to a target device like a post-it and utilized.

In addition, it is possible to reduce the size of the self-powered sensor and a complexity of a circuit by manufacturing a power generation unit and a sensing unit to be integrated into one.

In addition, the vibration and/or movement generated by the target device is converted into energy to charge the self-powered sensor, and the target device is monitored according to the wireless signal transmitted by the self-powered sensor charged over a certain amount, so that the status of the target device may be accurately determined.

Effects of the present disclosure are not limited to those mentioned above, and other effects not mentioned will be clearly understood by those skilled in the art from the following description.

DETAILED DESCRIPTION

A self-powered sensor according to an embodiment of the present disclosure includes a power generation unit converting an external physical stimulus into electrical energy, and a sensing unit generating and transmitting a sensing signal corresponding to the electrical energy, wherein the sensing unit includes an electrical energy storage unit storing the electrical energy transmitted from the power generation unit, a switching unit switching to an energized state or a power-saving state according to the comparison result of the storage amount of the electrical energy stored in the electrical energy storage unit and a reference storage amount, and a processor generating and wirelessly transmitting a sensing signal based on the electrical energy stored in the electrical energy storage unit when the switching unit switches to the energized state.

Advantages and features of the present disclosure and methods of achieving them will become apparent with reference to the embodiments described in detail with the accompanying drawings. However, it should be understood that the present disclosure is not limited to the embodiments presented below, but may be implemented in various forms different from each other, and includes all modifications, equivalents, and substitutes within the spirit and technical scope of the present disclosure. The following embodiments are provided to ensure that the disclosure of the present disclosure is complete and to fully inform the scope of the present disclosure to those skilled in the art. In describing the present disclosure, when it is determined that a detailed description of a related known technology may obscure the gist of the present disclosure, the detailed description thereof will be omitted.

The terminology used herein is for the purpose of describing particular embodiments only and is not intended to limit the present disclosure. The expression of the singular number includes the expression of the plural number unless clearly different in the context. In the present application, it should be understood that terms such as "include" or "have" are intended to designate that a feature, a number, a step, an operation, a component, a part, or a combination thereof described in the specification exists, but do not preclude the possibility of the presence or addition of one or more other features, numbers, steps, operations, components, parts, or combinations thereof. Terms such as "first" and "second" may be used to describe various elements, but the elements should not be limited by the terms. The terms are used only for the purpose of distinguishing one element from another element.

Hereinafter, embodiments according to the present disclosure will be described in detail with reference to the accompanying drawings, and in the description with reference to the accompanying drawings, the same or corresponding elements will be given the same reference numerals, and a repeated description thereof will be omitted.

Figure 1:
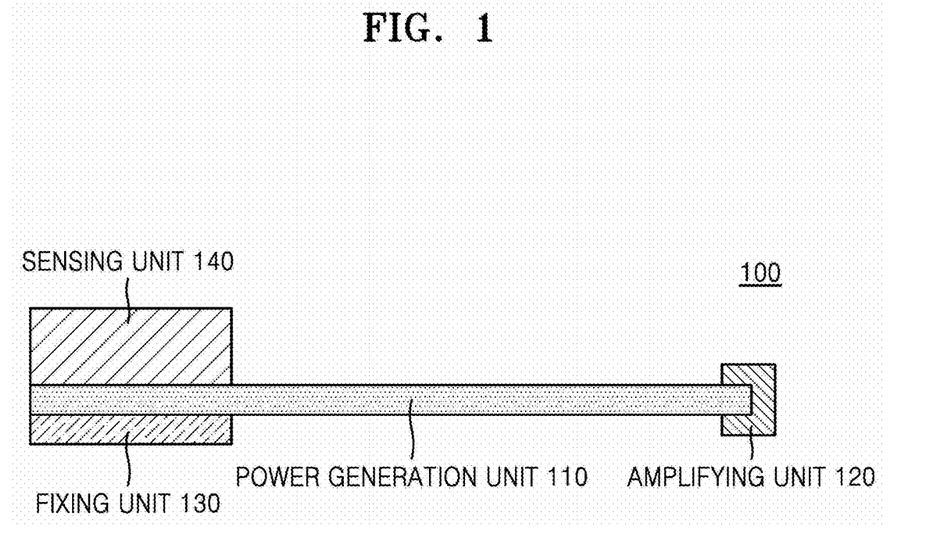
FIG. 1 is a side view of a self-powered sensor according to an embodiment of the present disclosure.
Figure 2:
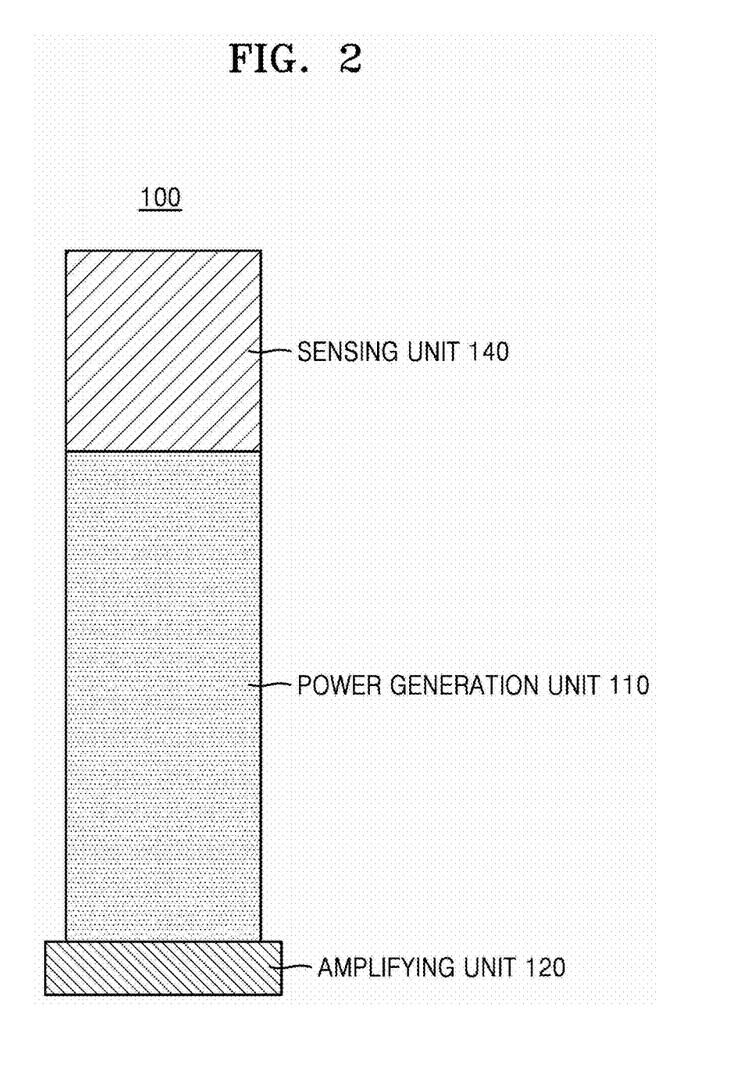
FIG. 2 is a plan view of a self-powered sensor according to an embodiment of the present disclosure.
Figure 3:
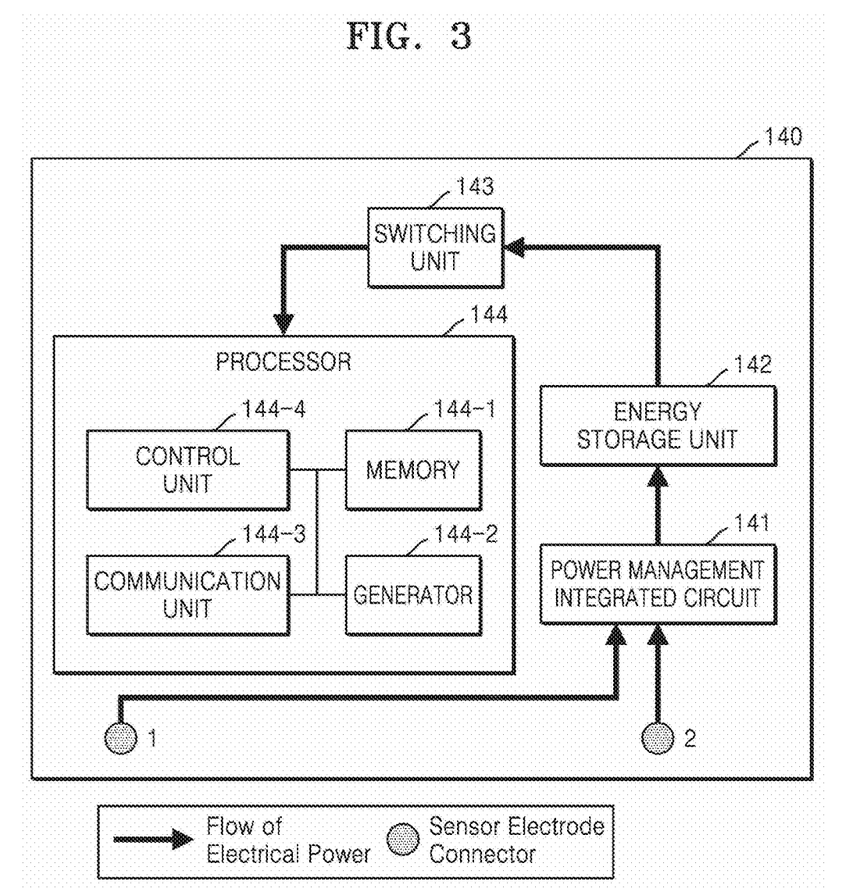
FIG. 3 is a block diagram schematically illustrating a configuration of a sensing unit of a self-powered sensor according to an embodiment of the present disclosure.
Figure 4:
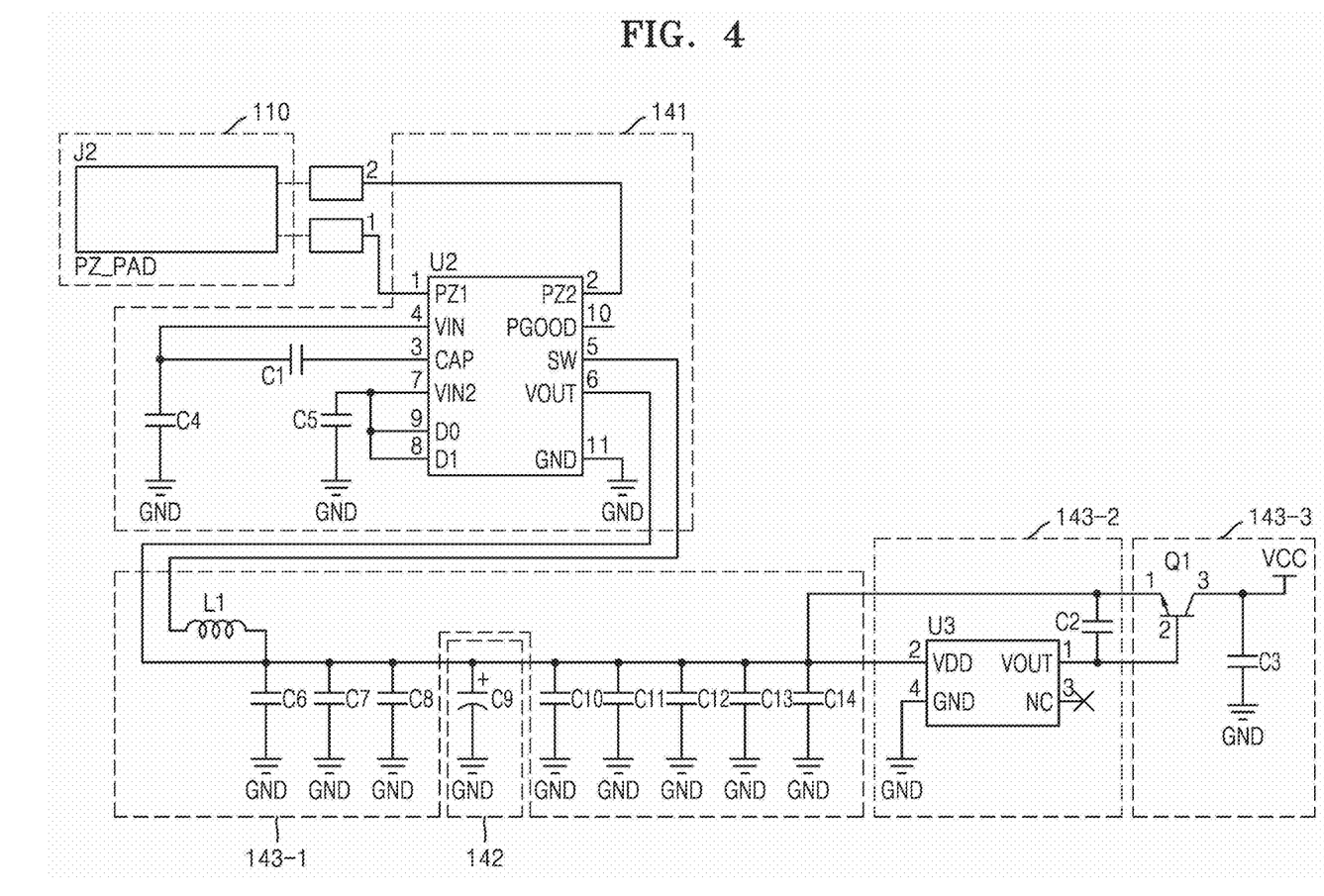
FIG. 4 is a circuit diagram of the sensing unit shown in FIG. 3.

FIG. 1 is a side view of a self-powered sensor according to an embodiment of the present disclosure, FIG. 2 is a plan view of a self-powered sensor according to an embodiment of the present disclosure, FIG. 3 is a block diagram schematically illustrating a configuration of a sensing unit of a self-powered sensor according to an embodiment of the present disclosure, and FIG. 4 is a circuit diagram of the sensing unit shown in FIG. 3.

Referring to FIGS. 1 to 4, a self-powered sensor 100 may include a power generation unit 110, an amplifying unit 120, a fixing unit 130, and a sensing unit 140.

The power generation unit 110 may convert an external physical stimulus into electrical energy. Here, the external physical stimulus may include one or more of pressure, friction vibration, sound, and ultrasound. The external physical stimulus may also include heat or light. This external physical stimulus may occur in a target device (200 in FIG. 5) equipped with the self-powered sensor 100.

The power generation unit 110 may include a device for converting the external physical stimulus into electrical energy. Such the device may include a self-powered device, a self-powered sensor, and the like, and may include, for example, a piezoelectric device, a triboelectric power generation device, a vibration power generation device, and the like. In addition, such the device may include a thermoelectric device or a solar power device, but is not limited thereto.

The amplifying unit 120 may be electrically connected to the power generation unit 110, amplify an external physical stimulus and output it to the power generation unit 110. For example, if the physical stimulus is friction vibration, the amplifying unit 120 may include a weight (not illustrated) that amplifies friction vibration. Here, the weight is a ball having characteristics such as ceramic or iron as a mass, and the physical energy generated by the movement and/or collision of the weight by friction vibration, which is an external physical stimulus, may be output to the power generation unit 110.

The fixing unit 130 is a component for attaching the self-powered sensor 100 to the target device 200, and may be formed by appropriately selecting according to a technique known in the art in consideration of the shape and attachment position of the target device 200. In this embodiment, one side of the fixing unit 130 may be attached to the lower surface of the power generation unit 110, and the other side may be attached to the target device 200. In this embodiment, the fixing unit 130 may use an adhesive, an adhesive sheet, a magnet, or the like.

The sensing unit 140 may generate a sensing signal corresponding to the electrical energy converted by the power generation unit 110 and transmit it to the outside. Referring to FIGS. 3 and 4, the sensing unit 140 may include a power management integrated circuit 141, an electrical energy storage unit 142, a switching unit 143, and a processor 144.

The power management integrated circuit (PMIC) 141 may rectify an AC voltage included in electrical energy transmitted from the power generation unit 110, convert the AC voltage into a DC voltage, and transmit the DC voltage to the electrical energy storage unit 142.

The electrical energy storage unit 142 may store the DC voltage transmitted from the power generation unit 110 and passed through the power management integrated circuit 141. In this embodiment, the electrical energy storage unit 142 may include a capacitor and a secondary battery. However, the electrical energy storage unit 142 is not limited thereto, and devices known in the art may be used without limitation. Specifically, a supercapacitor, a hybrid supercapacitor, a lithium battery, a lithium sulfur battery, a multi-layer ceramic capacitor (MLCC), a sodium sulfur battery, a redox flow battery, etc. may be used.

In this embodiment, the electrical energy storage unit 142 may include a capacitor (C9 in FIG. 4) for charging and discharging the DC voltage transmitted from the power management integrated circuit 141. This capacitor C9 may discharge the charged DC voltage to the processor 144 when the switching unit 143 switches to an energized state, and charge the DC voltage transmitted from the power management integrated circuit 141 when the switching unit 143 switches to an isolated state.

In this embodiment, the electrical energy storage unit 142 may include a main electrical energy storage unit (not illustrated) and a sub electrical energy storage unit (not illustrated). The main electrical energy storage unit may operate in the same manner as the electrical energy storage unit 142 to be described later. The sub electrical energy storage unit may store a remaining surplus power after the processor 144 generates and transmits the sensing signal wirelessly, and use the surplus power when necessary.

The switching unit 143 may convert the electrical energy storage unit 142 and the processor 144 to an electrically energized state or to a power-saving state. The switching unit 143 may switch to the energized state or the power-saving state according to a comparison result between the DC voltage stored in the electrical energy storage unit 142 and a reference voltage as a reference storage amount.

Referring to FIG. 4, the switching unit 143 may include a noise removing unit 143-1, a voltage detection unit 143-2, and a switch element 143-3.

The noise removing unit 143-1 may remove the noise of the DC voltage output from the power management integrated circuit 141. In this embodiment, the noise removing unit 143-1 may include an L/C noise filter.

The voltage detection unit 143-2 may detect the voltage charged in the capacitor C9 as the electrical energy storage unit 142.

As a result of voltage detection by voltage detection unit 143-2, when the voltage charged to capacitor C9 is above a preset reference value (for example, 3.0 V), the switch element 143-3 is converted to the energized state, and the DC voltage discharged from capacitor C9 may be output to the processor 144. As the result of voltage detection by voltage detection unit 143-2, when the voltage charged to capacitor C9 is less than the preset reference value (for example, 3.0 V), switch element 143-3 is switched to the power-saving state, and the capacitor C9 may be charged with the DC voltage output from the power management integrated circuit 141.

In this embodiment, transition to the energized state of the switch element 143-3 (i.e., turn on) and the start of the discharge of the capacitor C9 may be interpreted as the same meaning. In the present embodiment, the switch element 143-3 may be a semiconductor, a diode, a transistor, a Schmitt trigger device, and the like, but is not limited thereto.

Unlike a general switching unit, the switching unit 143 of this embodiment may have difficulty in switching to the power-saving state when the voltage stored in the capacitor C9 as the electrical energy storage unit 142 is from 0.0 V to less than the reference voltage of 3.0 V, and have difficulty in switching to the energized state when the voltage stored in the capacitor C9 is 3.0 V or more.

Since the general switching unit is designed to perform switching as the voltage drops from a high level to a low level, and a circuit that monitors the voltage is constantly monitoring the falling voltage, it is possible to operate the switching unit at the correct voltage and time as designed.

However, as a result of applying the general switching unit to this embodiment, it was confirmed that the voltage rising in the positive voltage direction from 0.0 V could not be properly detected and malfunctioned. In addition, it was confirmed that there is a difficulty in controlling the power characteristics of the irregular and intermittent self-powered method in order to prevent malfunction of the switching unit. In this embodiment, the power supply does not supply constant power to the sensing unit 140, but irregular and intermittent power is supplied through the power generation unit 110. Therefore, when applying the general switching unit to the present embodiment, it is difficult to implement the operation of the switch element 143-3 at a correct time while monitoring the voltage. A general switch element is designed monitor the voltage while being powered by a sufficient power supply. As a result, the general switch element may not be suitable for this embodiment because the power required to monitor the voltage at 3.0 V or less is similar to or equal to the amount of power generation. In other words, when the general switch element is employed in this embodiment, it is difficult to realize the purpose and effect of the present embodiment. That is, in order to realize the purpose and effect of the self-powered sensor 100, it is essential that the above-described switching unit 143 is employed.

In particular, as the voltage of the capacitor C9 fluctuates about ±0.2 V irregularly due to the characteristics of the supplied power, frequently, the switch element 143-3 operates without sufficient power in the capacitor C9, and the entire sensing unit 140 does not operates due to insufficient power. Therefore, in order to overcome these problems, the noise of the DC voltage input from the power management integrated circuit 141 is removed by using the noise removing unit 143-1 including the L/C noise filter, and the switching unit 143 was configured by further including the voltage detection unit 143-2 and the switch element 143-3.

From FIG. 4, the vibration energy generated in the power generation unit 110 is converted into the DC voltage in the power management integrated circuit 141 to charge the capacitor C9 as the electrical energy storage unit 142. As the capacitor C9 is charged, the voltage rises slowly from 0 V. When the charging voltage of the capacitor C9 reaches a voltage value set in the switching unit 143 (for example, 3.0 V), the switching unit 143 turns on and at the same time the capacitor C9 starts discharging, and the discharging power of the capacitor C9 is output to the processor 144, and the processor 144 starts to operate. As the processor 144 consumes power, the capacitor C9 is discharged, and as the capacitor C9 is discharged, the voltage value of the capacitor C9 decreases. When the voltage remaining in the capacitor C9 becomes lower than the voltage value set in the switching unit 143, the switching unit 143 is turned off, and the processor 144 stops operating.

The processor 144 may receive the voltage discharged by the capacitor C9 as the electrical energy storage unit 142 when the switching unit 143 is switched to the energized state and start operation to generate the sensing signal and transmit the generated sensing signal wirelessly.

In this embodiment, the processor 144 may include a memory 144-1, a generator 144-2, a communication unit 144-3, and a control unit 144-4.

The memory 144-1 may store a program driving the processor 144, a MAC address indicating unique information of the self-powered sensor 100, and a sensing signal generated by the generator 144-2.

The generator 144-2 may generate a sensing signal including own unique information (i.e., MAC address) and time information that the capacitor C9 has discharged. Here, a discharge period of the capacitor C9 may be found from the sensing signal. In an optional embodiment, the sensing signal generated by the generator 144-2 may further include a temperature value measured by a temperature measuring device (not illustrated) included in the processor 144, and furthermore, generate and include additional information such as humidity, pressure, illuminance, and current.

The communication unit 144-3 may transmit the sensing information generated by the generator 144-2 to the outside using a wireless communication method, for example, Bluetooth, Bluetooth low energy (BLE), infrared data association (IrDA), ZigBee, LoRa, etc. However, it is not limited to the wireless communication method, and wired communication is also possible.

The control unit 144-4 may control the entire operation of the processor 144. The control unit 144-4 may start the operation of the processor 144 when the switching unit 143 is turned on and power is supplied from the capacitor C9 as the electrical energy storage unit 142, and may terminate the operation of the processor 144 when the switching unit 143 is turned off and the power supply from the capacitor C9 as the electrical energy storage unit 142 is interrupted.

In the case of a conventional self-powered detection sensor, since a power generation unit for generating power energy and a sensing unit for sensing vibration of a target device are separately configured, a power control circuit connected to the power generation unit and a sensor control circuit connected to the sensing unit must exist individually, so that there are disadvantages in that the structure of the self-powered detection sensor is complicated and power consumption is high. That is, as the structure of the conventional self-powered detection sensor becomes complicated, the manufacturing cost increases, and due to the limitation of the amount of power produced by self-generation, the output must be increased by using a number of piezoelectric devices, triboelectric devices, etc. On the other hand, in the present embodiment, since the power generation unit and the sensing unit are integrated into one, the disadvantages of the prior art as described above may be very efficiently solved.

Figure 5:
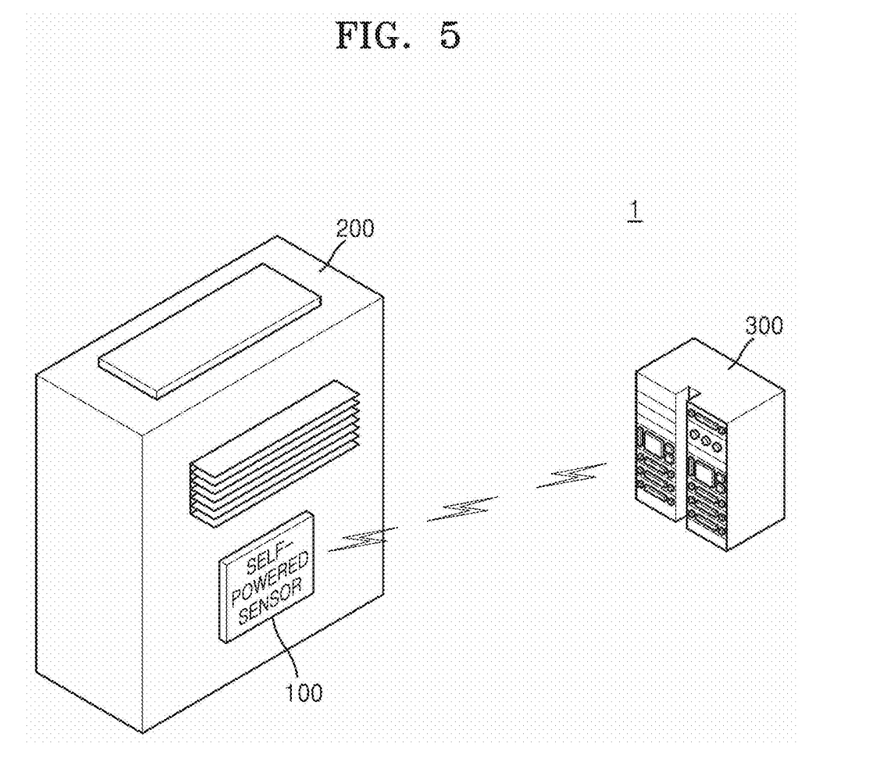
FIG. 5 is an exemplary diagram schematically illustrating a monitoring system according to an embodiment of the present disclosure.
Figure 6:
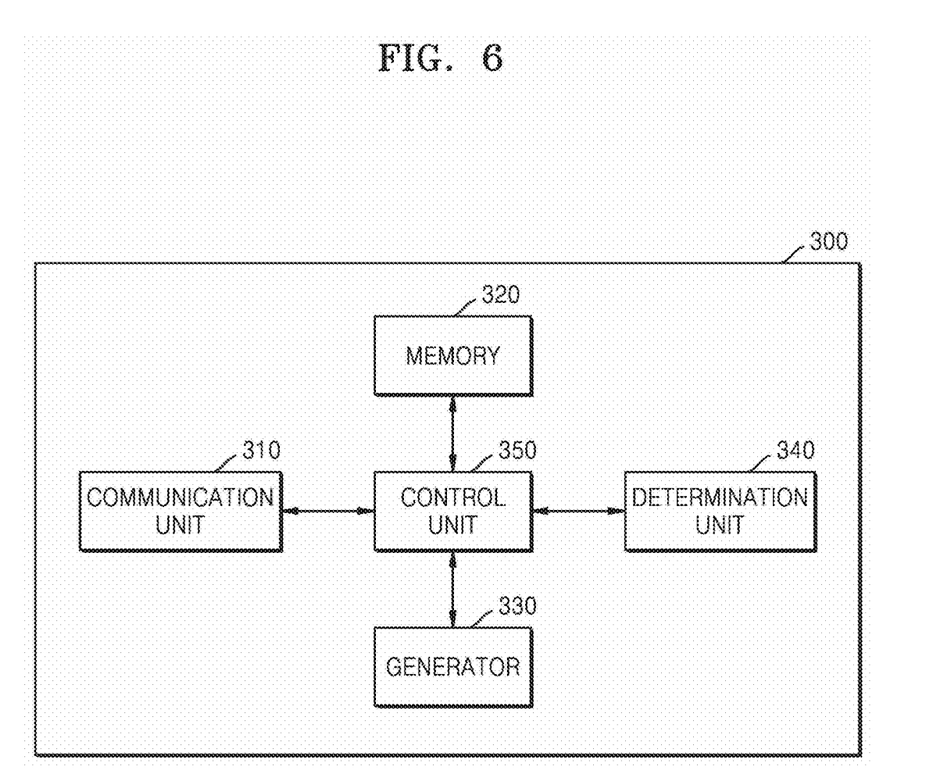
FIG. 6 is a block diagram schematically illustrating a configuration of a monitoring device of the monitoring system of FIG. 5.

FIG. 5 is an exemplary diagram schematically illustrating a monitoring system according to an embodiment of the present disclosure, and FIG. 6 is a block diagram schematically illustrating a configuration of a monitoring device of the monitoring system of FIG. 5. In the following description, parts overlapping with those of FIGS. 1 to 4 will be omitted.

Referring to FIGS. 5 and 6, a monitoring system 1 may include the self-powered sensor 100, the monitoring target device 200 and a monitoring device 300.

The self-powered sensor 100 may be mounted on the monitoring target device 200 to generate the sensing signal corresponding to physical energy generated from the monitoring target device 200 and transmit the sensing signal to the monitoring device 300. Since the detailed description of the self-powered sensor 100 is the same as that of FIGS. 1 to 4, a detailed description thereof will be omitted.

The monitoring device 300 may monitor the status of the monitoring target device 200 by collecting the sensing signal transmitted by the self-powered sensor 100 mounted on the monitoring target device 200. In this embodiment, the monitoring device 300 may include a beacon scanner, a gateway, a repeater, and the like.

In this embodiment, the monitoring device 300 may include a communication unit 310, a memory 320, a generator 330, a determination unit 340, and a control unit 350.

The communication unit 310 may provide a communication interface required to provide a transmission/reception signal between the self-powered sensor 100 and the monitoring device 300 in the form of packet data. In this embodiment, the communication unit 310 may use a wireless communication interface, for example, Bluetooth, Bluetooth low energy (BLE), infrared data association (IrDA), ZigBee, LoRa, etc., but is not limited thereto, and a wired communication interface is also available. Also, the communication unit 310 may be a device including hardware and software necessary for transmitting and receiving signals such as control signals or data signals through wired/wireless connection with other network devices.

The memory 320 may perform a function of temporarily or permanently storing data processed by the control unit 350. In this embodiment, the memory 320 may store the sensing signal transmitted by the self-powered sensor 100, and may store the monitoring sensing data generated by the generator 330. Here, the memory 320 may include magnetic storage media or flash storage media, but the scope of the present disclosure is not limited thereto. The memory 320 may include an internal memory and/or an external memory, and may include volatile memory, non-volatile memory, a flash drive, or a storage device, wherein volatile memory is like dynamic random access memory (DRAM), static random access memory (SRAM), or synchronous dynamic random access memory (SDRAM), wherein non-volatile memory is like one time programmable read-only memory (OTPROM), programmable read-only memory (PROM), erasable and programmable-read only memory (EPROM), electrically erasable and programmable read only memory (EEPROM), mask read-only memory (mask ROM), flash read-only memory (flash ROM), NAND flash memory, or NOR flash memory, wherein the flash drive is like solid state drive (SSD), compact flash card (CF card), secure digital card (SD card), micro-secure digital card (micro-SD card), mini-secure digital card (mini-SD card), Xd card, or memory stick, and wherein the storage device is like hard disk drive (HDD).

The generator 330 may generate monitoring sensing data by combining the sensing signal transmitted by the self-powered sensor 100 and a signal receiving period indicating how frequently the sensing signal is received at the monitoring device 300. Here, the monitoring device 300 that receives the same sensing signal at a predetermined time interval may calculate the signal receiving period through the generator 330, and may generate monitoring sensing data by combining the signal receiving period with the sensing signal.

The determination unit 340 may calculate the rate of change of the signal receiving period from the monitoring sensing data, and determine whether the operation of the monitoring target device 200 is abnormal based on the rate of change of the signal receiving period. The determination unit 340 may determine that the monitoring target device 200 is operating normally when the rate of change of the signal receiving period is below a preset range, and determine that the monitoring target device 200 is operating abnormally when the rate of change of the signal receiving period exceeds the preset range.

Here, the preset range may be set based on the signal (data) collected by the self-powered sensor 100. For example, the signal (data) collected from the self-powered sensor 100 for a predetermined period may be learned through deep learning, and thus the preset range may be derived. In other words, the preset range is not set by a user or technician of the self-powered sensor 100, but may be set by the signal collected from the self-powered sensor 100.

The control unit 350 may receive the determination result of the determination unit 340 and generate monitoring result information for controlling the operation of the monitoring target device 200. The control unit 350 may generate the monitoring result information for terminating the operation of the monitoring target device 200 when receiving the determination result from the determination unit 340 that the rate of change of the signal receiving period exceeds the preset range and the monitoring target device 200 is abnormal. The control unit 350 may generate monitoring result information for instructing to generate an alarm in response to the determination result of determining that the monitoring target device 200 is abnormal before terminating the operation of the monitoring target device 200.

Such monitoring result information may be output through a display unit (not illustrated) provided in the monitoring device 300 or transmitted to a manager's terminal so that the manager controls the monitoring target device 200 after confirmation.

In this embodiment, the control unit 350 may control the overall operation of the monitoring device 300. The control unit 350 may include all kinds of devices capable of processing data, such as a processor. Here, the processor may refer to a data processing device embedded in hardware having a physically structured circuit to perform a function expressed by, for example, codes or commands included in a program. As an example of the data processing device embedded in the hardware as described above, it encompasses processing devices such as a microprocessor, a central processing unit (CPU), a processor core, a multiprocessor, an application-specific integrated circuit (ASIC), and a field programmable gate array (FPGA), but the scope of the present disclosure is not limited thereto.

Figure 7:
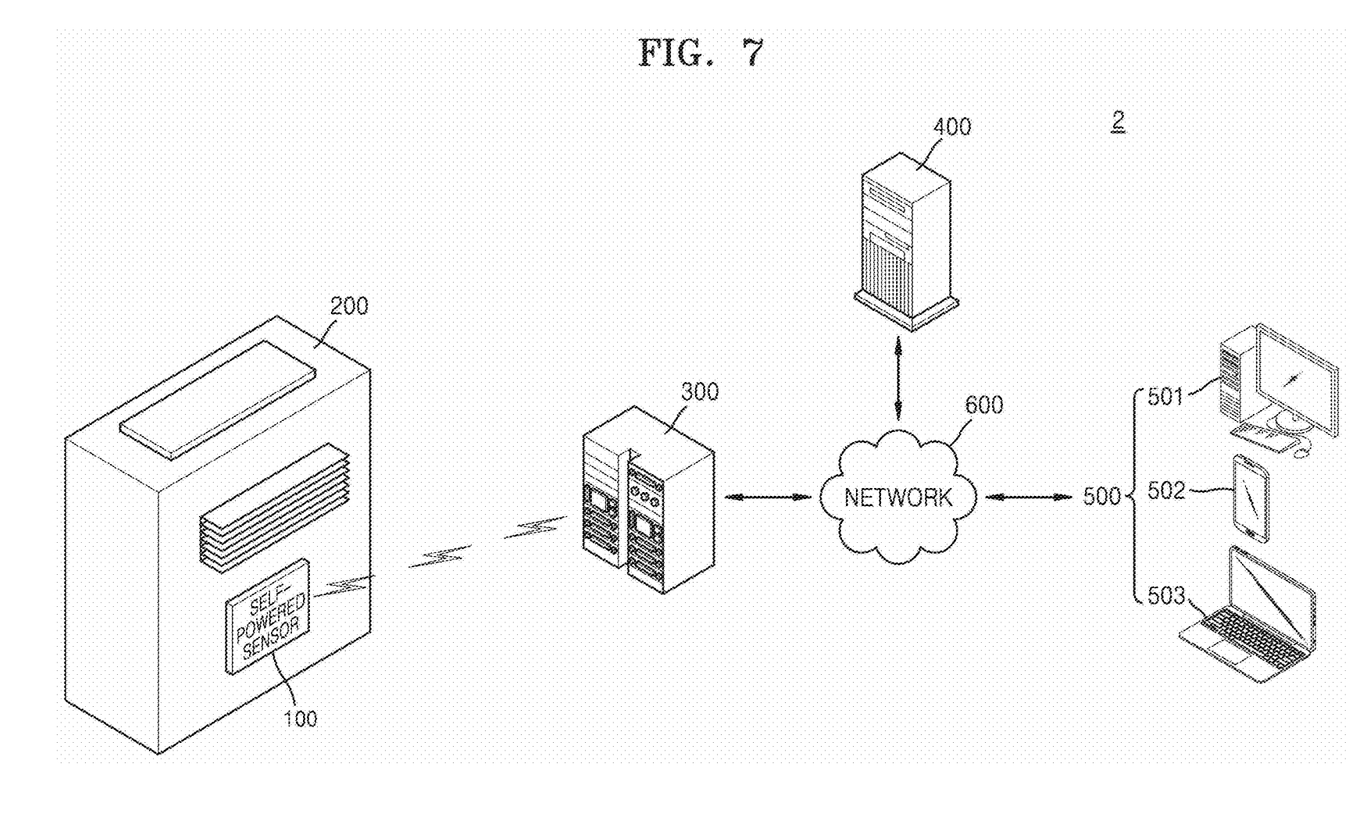
FIG. 7 is an exemplary diagram schematically illustrating a monitoring system according to another embodiment of the present disclosure.

FIG. 7 is an exemplary diagram schematically illustrating a monitoring system according to another embodiment of the present disclosure. In the following description, descriptions of parts overlapping with those of FIGS. 1 to 6 will be omitted. Referring to FIG. 7, a monitoring system 2 may include the self-powered sensor 100, the monitoring target device 200, a gateway 300, a monitoring device 400, a manager terminal 500 and a network 600.

The self-powered sensor 100 may be mounted on the monitoring target device 200 to generate the sensing signal corresponding to physical energy generated from the monitoring target device 200 and transmit the sensing signal to the gateway 300. Since the detailed description of the self-powered sensor 100 is the same as that of FIGS. 1 to 4, a detailed description thereof will be omitted.

The gateway 300 may collect the sensing signal transmitted by the self-powered sensor 100 mounted on the target device 200 and transmit the sensing signal to the monitoring device 400 through the network 600. In this embodiment, the gateway 300 may perform the same function as the monitoring device 300 illustrated in FIGS. 5 and 6, and a detailed description thereof will be omitted. In this embodiment, the gateway 300 may transmit/receive data to/from the self-powered sensor 100 through the wireless communication interface, and may transmit/receive data to/from the monitoring device 400 through the network 600.

The monitoring device 400 may monitor the status of the monitoring target device 200 by collecting the sensing signal transmitted by the self-powered sensor 100 mounted on the monitoring target device 200 through the gateway 300 and the network 600.

The monitoring device 400 may generate monitoring sensing data as time series data combining the sensing signal and the signal receiving period indicating how frequently the sensing signal is received at the monitoring device 400, and classify the status information of the monitoring target device 200 corresponding to the monitoring sensing data by using an unsupervised learning-based deep learning model which has been pre-trained to classify the status information of the monitoring target device when the monitoring sensing data is input.

In this embodiment, the monitoring device 400 may perform machine learning, such as deep learning, on the monitoring sensing data to monitor the status of the monitoring target device 200 using the monitoring sensing data, and store data used for machine learning, result data and the like.

Deep learning technology, which is a type of machine learning, may learn by going down to a deep level in multiple stages based on data. Deep learning may represent a set of machine learning algorithms that extract core data from a plurality of data as the level increases.

A deep learning structure may include an artificial neural network (ANN), and the deep learning structure may be configured as a deep neural network (DNN), for example, a convolutional neural network (CNN), a recurrent neural network (RNN), a deep belief network (DBN), etc. The deep learning structure according to the present embodiment may use various well-known structures. For example, the deep learning structure according to the present disclosure may include the convolutional neural network (CNN), the recurrent neural network (RN N), the deep belief network (DBN), etc. The recurrent neural network (RNN)) may be widely used in natural language processing, etc., and be an effective structure for processing time series data that changes over time, and construct an artificial neural network structure by stacking layers at every moment. The deep belief network (DBN) may include a deep learning structure constructed by stacking a restricted boltzman machine (RBM), a deep learning technique, in multiple layers. When a certain number of layers is reached by repeating the restricted boltzman machine (RBM) training, the deep belief network (DBN) having the corresponding number of layers may be constructed. The convolutional neural network (CNN) may include a model simulating the human brain function, wherein the model is created based on the assumption that when a person recognizes an object, the basic features of the object are extracted, then the brain performs complex calculations and recognizes the object based on the result.

On the other hand, artificial neural network learning may be accomplished by adjusting the weight of the connecting line between nodes (and adjusting the bias value if necessary) so that a desired output is obtained for a given input. In addition, the artificial neural network may continuously update the weight value by learning. In addition, methods such as back propagation may be used for artificial neural network learning.

On the other hand, the artificial neural network may be mounted on the monitoring device 400, and machine learning-based status information clustering of a compressor using received operation data of the compressor as input data may be performed.

The monitoring device 400 may include the artificial neural network and the deep neural network (DNN), for example, the convolutional neural network (CNN), the recurrent neural network (RNN), the deep belief network (DBN), etc., and learn the deep neural network. Supervised learning, unsupervised learning, and reinforcement learning may all be used as a machine learning method for such the artificial neural network. The monitoring device 400 may be controlled to update the artificial neural network structure after learning according to the settings.

Supervised learning refers to a method of training the artificial neural network in a state where a label for learning data is given, and the label may mean a correct answer (or result value) that the artificial neural network should infer when the learning data is input to the artificial neural network. Unsupervised learning may refer to a method of training the artificial neural network in a state where no label is given for learning data. Reinforcement learning may refer to a learning method in which an agent defined in an environment is taught to select an action or sequence of actions that maximizes the cumulative reward in each state. In this embodiment, unsupervised learning may be performed to determine the state of the monitoring target device 200, but is not limited thereto.

The manager terminal 500 may access a monitoring application and/or a monitoring site provided by the monitoring device 400 to receive a monitoring service for the monitoring target device 200.

The manager terminal 500 may include a communication terminal capable of performing the function of a computing device (not illustrated), and may be a desktop computer 501 operated by a user, a smartphone 502, a notebook 503, a tablet personal computer, smart television, mobile phone, personal digital assistant (PDA), laptop, media player, micro server, global positioning system (GPS) device, e-book terminal, digital broadcasting terminal, navigation, kiosk, MP3 player, digital camera, home appliance and other mobile or non-mobile computing devices, but is not limited thereto. In addition, the manager terminal 500 may be a wearable terminal such as a watch, glasses, hair band and ring having a communication function and data processing function. The manager terminal 500 is not limited to the above, and a terminal capable of web browsing may be borrowed without limitation.

The network 600 may serve to connect the gateway 300, the monitoring device 400 and the manager terminal 500. Such network 600 may encompass wired networks such as local area networks (LANs), wide area networks (WANs), metropolitan area networks (MANs) and integrated service digital networks (ISDNs), or wireless network such as wireless local area networks (wireless LANs), code division multiple access (CDMA), Bluetooth and satellite communication, but the scope of the present disclosure is not limited thereto. In addition, the network 600 may transmit and receive information using short-distance communication and/or long-distance communication. Here, short-distance communication may include Bluetooth, radio frequency identification (RFID), infrared data association (IrDA), ultra-wideband (UWB), ZigBee, wireless fidelity (Wi-Fi) technology, and long-distance communication may include code division multiple access (CDMA), frequency division multiple access (FDMA), time division multiple access (TDMA), orthogonal frequency division multiple access (OFDMA), single carrier frequency division multiple access (SC-FDMA) technology.

The network 600 may include connections of network elements such as hubs, bridges, routers and switches. The network 600 may include one or more connected networks, such as a multi-network environment, including a public network such as the Internet and a private network such as a secure corporate private network. Access to network 600 may be provided via one or more wired or wireless access networks. Furthermore, the network 600 may support an Internet of Things (IoT) network that exchanges and processes information between distributed components such as things and/or 5G communication.

Figure 8:
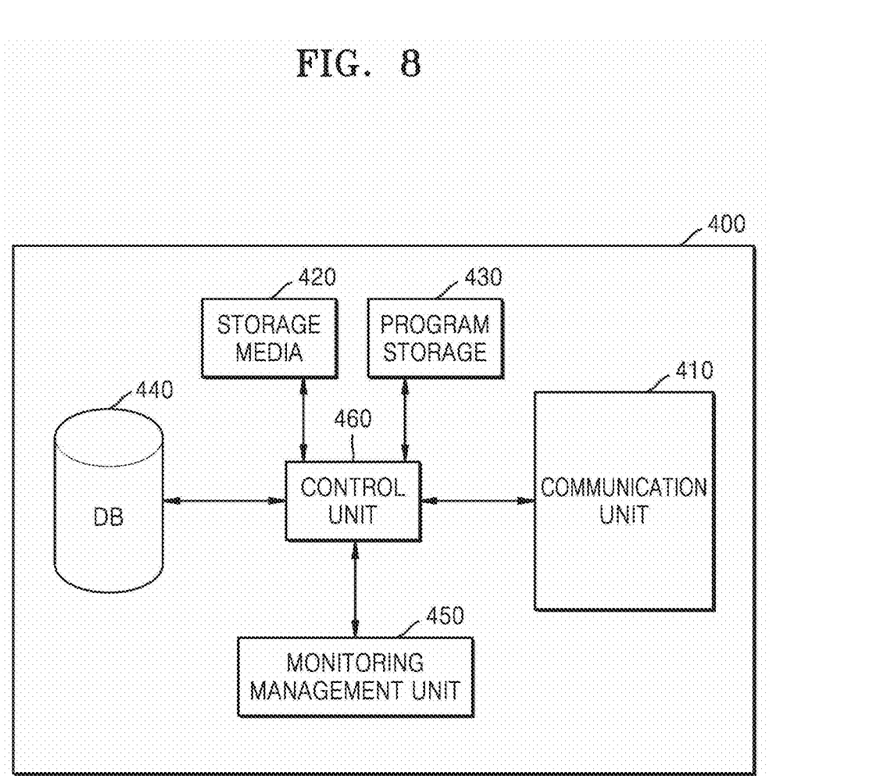
FIG. 8 is a block diagram schematically illustrating a configuration of a monitoring device of the monitoring system of FIG. 7.
Figure 9:
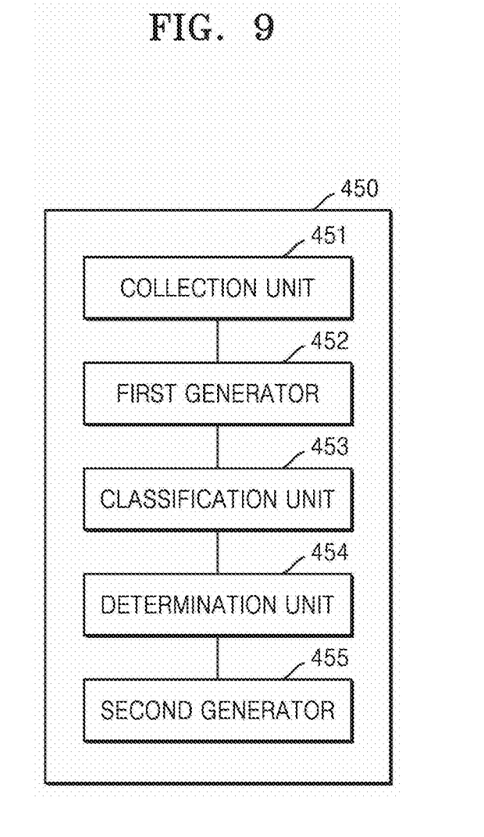
FIG. 9 is a block diagram schematically illustrating a configuration of a monitoring management unit of the monitoring device of FIG. 8.

FIG. 8 is a block diagram schematically illustrating a configuration of a monitoring device of the monitoring system of FIG. 7, and FIG. 9 is a block diagram schematically illustrating a configuration of a monitoring management unit of the monitoring device of FIG. 8. In the following description, parts overlapping with those of FIGS. 1 to 7 will be omitted.

Referring to FIGS. 8 and 9, the monitoring device 400 may include a communication unit 410, a storage medium 420, a program storage 430, a database 440, a monitoring management unit 450 and a control unit 460.

The communication unit 410 may provide a communication interface necessary to provide a transmission/reception signal between the gateway 300, the monitoring device 400 and the manager terminal 500 in the form of packet data by interworking with the network 600. Also, the communication unit 410 may serve to transmit information collected by the gateway 300 to the monitoring device 400. Furthermore, the communication unit 410 may serve to receive a predetermined information request signal from the manager terminal 500, and may serve to transmit information processed by the monitoring management unit 450 to the manager terminal 500. Here, a communication network is a medium that connects the gateway 300, the monitoring device 400 and the manager terminal 500, and may include a path providing an access path so that the manager terminal 500 may transmit and receive information after accessing the monitoring device 400. In addition, the communication unit 410 may be a device including hardware and software necessary for transmitting and receiving signals such as control signals or data signals through wired/wireless connection with other network devices.

The storage medium 420 performs a function of temporarily or permanently storing data processed by the control unit 460. Here, the storage medium 420 may include magnetic storage media or flash storage media, but the scope of the present disclosure is not limited thereto.

The program storage 430 is loaded with control software that performs a task of generating monitoring sensing data when the sensing signal is received from the self-powered sensor 100 through the gateway 300, a task of classifying the status information of the monitoring target device 200 corresponding to the monitoring sensing data by using the pre-trained unsupervised learning-based deep learning model, a task of judging the abnormal state of the monitoring target device 200 by using the pre-trained deep neural network model, a task of generating a notification before the complete failure of the monitoring target device 200 in response to the abnormal state judgment of the monitoring target device 200, and the like.

The database 440 may further include a management database storing monitoring sensing data for the monitoring target device 200, status information history for the monitoring target device 200 and abnormal state determination result history for the monitoring target device 200.

Also, the database 440 may include a user database storing information of a manager who will receive a monitoring service for the monitoring target device 200. Here, information of the manager may be included basic information about the elderly with dementia and caregivers, such as the manager's name, affiliation, personal information, gender, age, contact information, email, address and image, information about the user's authentication (login), such as ID (or e-mail) and password, information about the country of access, the location of the access and the device used to access, and information related to access, such as the connected network environment.

Also, manager's unique information, information and/or category history provided by the manager accessing the monitoring application or monitoring site, environment setting information set by the manager, resource usage information used by the manager, billing and payment information in response to the manager's resource usage may be stored in the user database.

The monitoring management unit 450 may generate monitoring result information for the monitoring target device 200 by using the collected sensing signal. Referring to FIG. 9, the monitoring management unit 450 may include a collection unit 451, a first generator 452, a classification unit 453, a determination unit 454, and a second generator 455.

The collection unit 451 may collect the sensing signal from the self-powered sensor 100 mounted on the monitoring target device 200 through the gateway 300 and the network 600.

The first generator 452 may generate monitoring sensing data as time series data combining the sensing signal collected by the collection unit 451 and the signal receiving period indicating how frequently the sensing signal is received at the monitoring device 400. Here, the signal receiving period may include a first signal receiving period generated by the gateway 300 and included in the sensing signal, and a second signal receiving period in which the monitoring device 400 receives the sensing signal including a first signal receiving period.

The classification unit 453 may classify the status information of the monitoring target device 200 corresponding to the monitoring sensing data by using the unsupervised learning-based deep learning model which has been pre-trained to classify the status information of the monitoring target device when the monitoring sensing data generated by the first generator 452 is input. Here, the unsupervised learning-based deep learning model may use one or more of the algorithms such as auto encoder, k-means clustering, self-organizing map, deep belief network, support vector machine, and the like.

In addition, depending on the type of algorithm, the status information of the monitoring target device 200 finally output from the unsupervised learning-based deep learning model may be classified into one or more of whether the monitoring target device 200 is idle, whether the monitoring target device 200 is operating, the type of product produced by the monitoring target device 200, daily output of the product.

Figure 10:
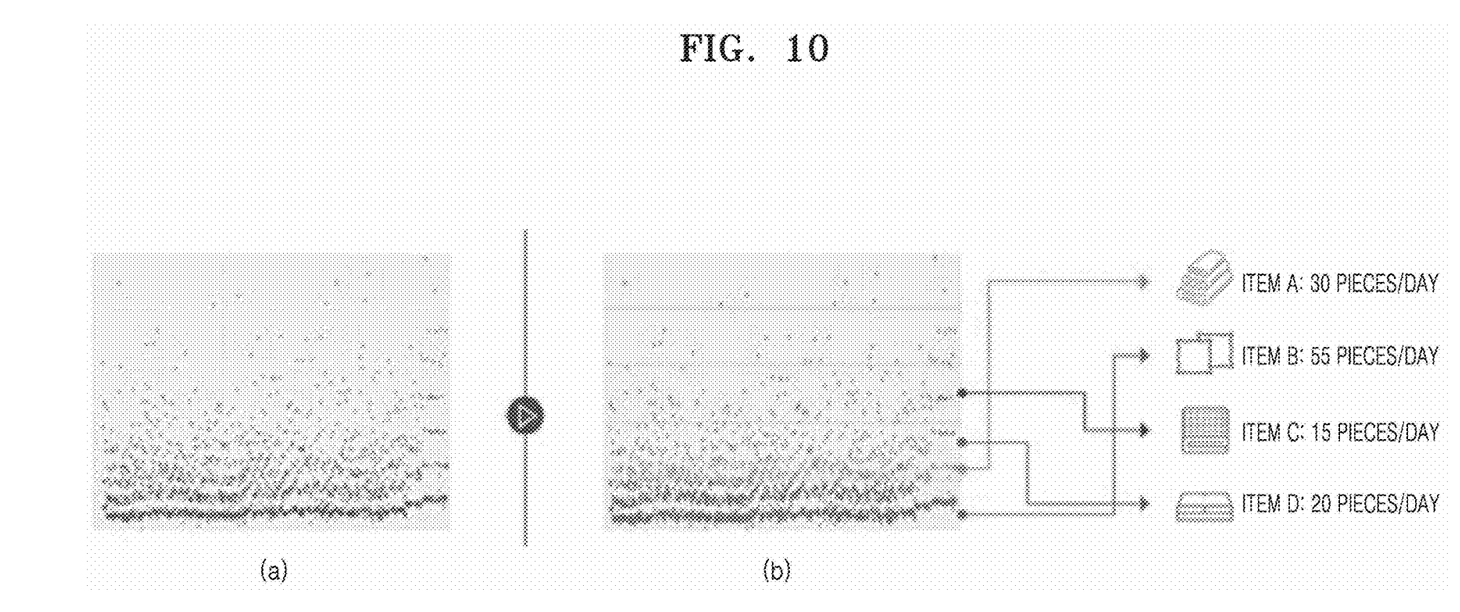
FIG. 10 is a diagram illustrating status information of a monitoring target device classified by the monitoring device of FIG. 8.

FIG. 10 illustrates the type and daily output of product produced by the monitoring target device 200, which are the classification result (b) generated by learning monitoring sensing data (a) generated by the monitoring device 400 with the unsupervised learning-based deep learning model.

The determination unit 454 may determine the abnormal state of the monitoring target device 200 by using the deep neural network model which has been pre-trained to determine the abnormal state of the monitoring target device by using the status information of the monitoring target device classified by the classification unit 453. Here, the deep neural network model may be the neural network model trained in advance by using training data including whether the monitoring target device 200 is in an idle state, whether the monitoring target device 200 is operating, the type of product produced by the monitoring target device 200 and daily output of products.

The second generator 455 may generate monitoring result information that receives the determination result of the determination unit 454 and controls the operation of the monitoring target device 200. The second generator 455 may generate monitoring result information that terminates the operation of the monitoring target device 200 in response to the result of determining that the monitoring target device 200 is in the abnormal state by the determination unit 454. The control unit 350 may generate monitoring result information that instructs to generate the alarm in response to the determination result of determining the monitoring target device 200 as an abnormal state before terminating the operation of the monitoring target device 200. By generating such monitoring result information, it is possible to generate the notification before a complete failure of the monitoring target device 200 and respond accordingly.

Returning to FIG. 8, the control unit 460 is a kind of central processing unit, and may control the entire operation of the monitoring device 400 by driving the control software mounted on the program storage 430. The control unit 460 may include any type of device capable of processing data, such as the processor. Here, the processor may refer to a data processing device embedded in hardware having a physically structured circuit to perform a function expressed by, for example, codes or commands included in a program. As an example of the data processing device embedded in the hardware as described above, it encompasses processing devices such as a microprocessor, a central processing unit (CPU), a processor core, a multiprocessor, an application-specific integrated circuit (ASIC), and a field programmable gate array (FPGA), but the scope of the present disclosure is not limited thereto.

The embodiment according to the present disclosure described above may be implemented in the form of a computer program that can be executed through various components on a computer, and such a computer program may be recorded in a computer-readable medium. In this case, the medium may include a magnetic media such as hard disk, floppy disk, and magnetic tape, an optical recording medium such as compact disc read-only memory (CD-ROM) and digital video disk (DVD), a magneto-optical medium such as a floptical disk, and a hardware device specially configured to store and execute program commands, such as read-only memory (ROM), random-access memory (RAM), flash memory, and the like.

Meanwhile, the computer program may be specially designed and configured for the present invention, or may be known and available to those skilled in the computer software field. Examples of computer programs may include high-level language codes that can be executed by a computer using an interpreter as well as machine language codes such as those generated by a compiler.

In the specification of the present disclosure (especially in the claims), the use of the term 'above' and similar referential terms may correspond to both the singular and the plural. In addition, when the range is described in the present disclosure, the disclosure including the disclosure to which the individual values belonging to the range are applied (if there is no description on the contrary) is the same as the description of each individual value constituting the range in the detailed description of the disclosure.

Steps constituting the method according to the present disclosure may be performed in an appropriate order, unless there is an explicit order or description to the contrary. The present disclosure is not necessarily limited to the order in which the steps are described. In the present disclosure, all examples or the use of illustrative terms (e.g., the like) are merely for the purpose of describing the present disclosure in detail, and the scope of the present disclosure is not limited by the above examples or illustrative terms unless limited by the claims. In addition, those skilled in the art can appreciate that various modifications, combinations, and changes can be made according to design conditions and factors within the appended claims or the scope of equivalents thereof.

Therefore, the spirit of the present disclosure is not limited to the above-described embodiment, and all ranges equally or equivalently changed from the claims as well as the claims to be described below are within the scope of the spirit of the present disclosure.

What is claimed is:

1. A monitoring system comprising:
   a self-powered sensor mounted on a monitoring target device to generate and transmit a sensing signal corresponding to physical energy generated by the monitoring target device; and
   a monitoring device configured to collect the sensing signal transmitted by the self-powered sensor and monitoring a status of the monitoring target device,
   wherein the monitoring device comprises:
   a first generator configured to generate monitoring sensing data as time series data combining the sensing signal and a signal receiving period indicating how frequently the sensing signal is received at the monitoring device;
   a classification unit configured to classify status information of the monitoring target device corresponding to the monitoring sensing data by using an unsupervised learning-based deep learning model trained in advance to classify the status information of the monitoring target device when monitoring sensing data is input; and
   a determination unit configured to determine an abnormal state of the monitoring target device using a deep neural network model trained in advance to determine the abnormal state of the monitoring target device using the status information of the monitoring target device,
   wherein the deep neural network model is a neural network model trained in advance using training data comprising whether the monitoring target device is in an idle state, whether the monitoring target device is in operation, a type of product produced by the monitoring target device, and a daily output of the product.

2. The monitoring system of claim 1, wherein the status information of the monitoring target device comprises:
   at least one of whether the monitoring target device is in an idle state, whether the monitoring target device is in operation, a type of product produced by the monitoring target device, or a daily output of the product.

3. The monitoring system of claim 1, further comprising a second generator configured to generate monitoring result information controlling an operation of the monitoring target device in response to the determination of the abnormal state of the monitoring target device.

* * * * *